UNITED STATES PATENT OFFICE.

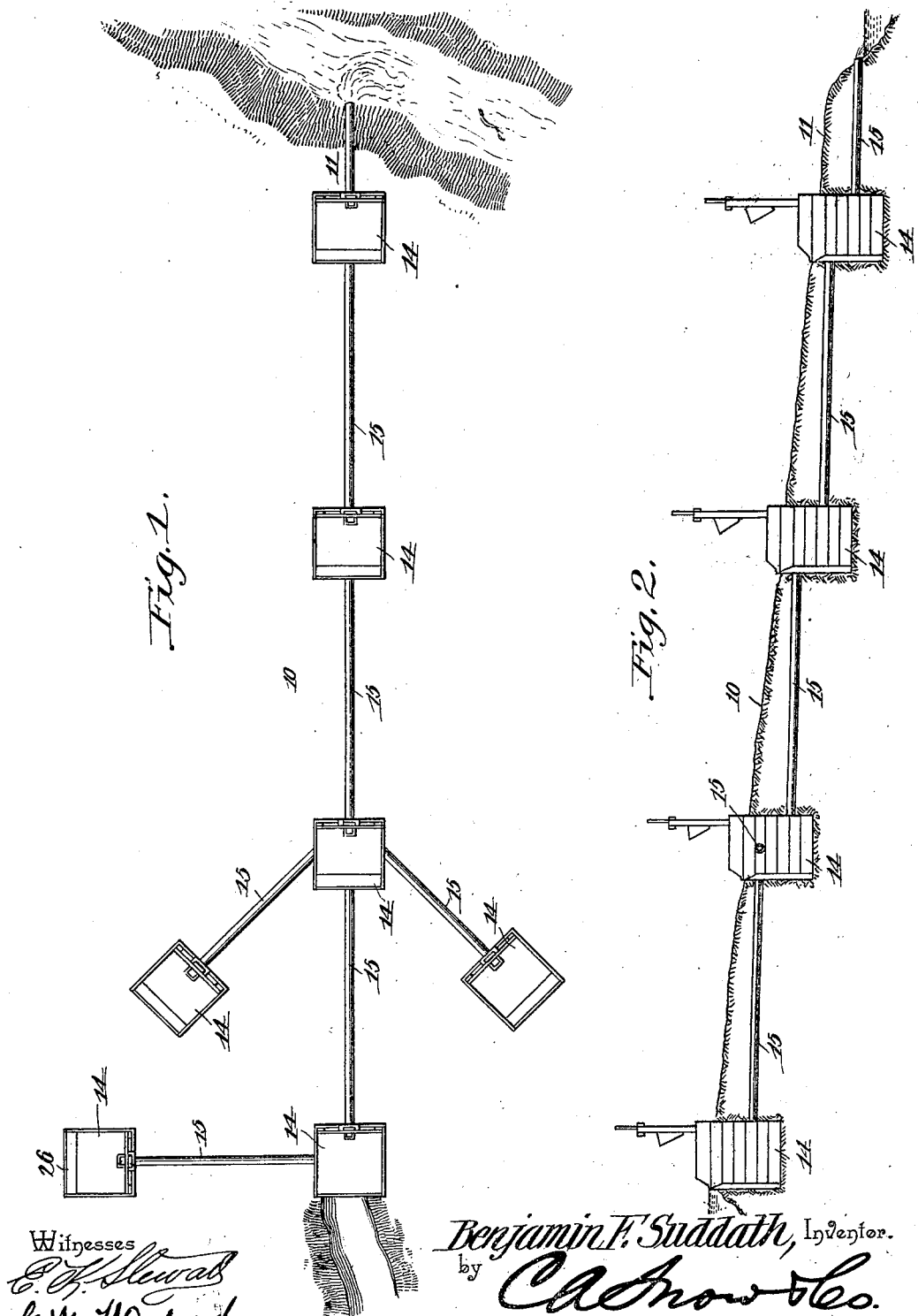

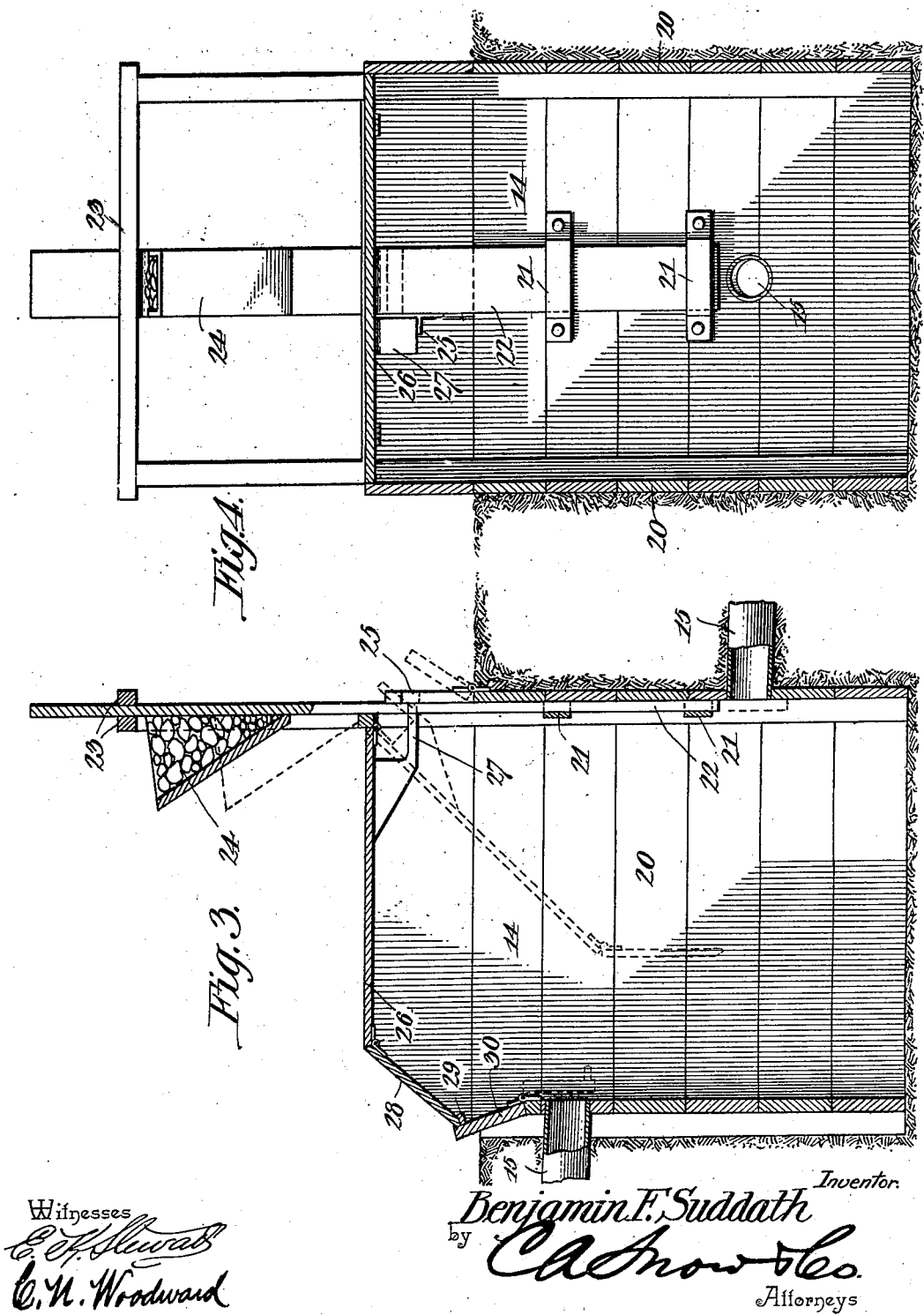

BENJAMIN F. SUDDATH, OF GILLSVILLE, GEORGIA.

DRAINAGE SYSTEM.

SPECIFICATION forming part of Letters Patent No. 725,793, dated April 21, 1903.

Application filed December 29, 1902. Serial No. 137,036. (No model.)

*To all whom it may concern:*

Be it known that I, BENJAMIN F. SUDDATH, a citizen of the United States, residing at Gillsville, in the county of Banks and State of Georgia, have invented a new and useful Drainage System, of which the following is a specification.

The principal object of the present invention is to improve the value of cultivated fields traversed by small creeks or rivulets by providing means whereby the ground forming the bottom of the creek or rivulet may be cultivated in the same manner as the rest of the field without diverting the water; and to this end the invention comprises in general means whereby the water may be safely conveyed through underground conduits for any desired distance.

A further and important object of the invention is to provide means for preventing the accumulation of silt and deposits in the conduits in order to avoid clogging.

A still further object of the invention is to provide automatic mechanism for cutting off the flow of water through the conduits in the event of overflow of a volume of water in excess of the capacity of the conduits to thereby prevent the filling of the conduits with sand and similar material.

A still further object of the invention is to provide catch-basins at intervals in the length of the conduit for the purpose of retaining the sand and other material and preventing the entrance of the same to the conduits.

A still further object of the invention is to provide means whereby bodies of water may be allowed to accumulate at intervals to form strong currents of water for flushing the conduits and washing out any sediment therein.

A still further object of the invention is to provide for the storage of water in any desired quantity at convenient intervals for use for the watering of stock, irrigating, and other purposes.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a plan view, in the nature of a diagram, illustrating a drainage apparatus or system in accordance with the invention. Fig. 2 is a longitudinal sectional elevation of the same. Fig. 3 is an enlarged sectional elevation of one of the reservoirs or tanks which form a part of the apparatus. Fig. 4 is a transverse sectional elevation of the same.

Similar numerals of reference are employed to indicate corresponding parts throughout the several figures of the drawings.

The high side of the land to be drained is indicated at 10 and the low side at 11, and from side to side there extends a drainage apparatus, preferably following the former course of a creek or other natural drain and comprising a plurality of underground conduits and intervening reservoirs or tanks, the conduits being arranged under the surface of the ground, so that the bed of the creek may be cultivated in the same manner as the remaining portion of the field.

At suitable points, as may be dictated by the contour of the ground or by other requirements, are reservoirs or tanks 14, preferably arranged at comparatively short intervals and located at gradually lower levels from the high to the low side of the field, the lower part of the uppermost or highest reservoir being sufficiently above the upper portion of the next succeeding reservoir to cause the water to flow freely through the connecting-conduits, (indicated at 15,) and so on to the final discharge, so that if left to itself the water will continuously flow through the conduits and reservoirs.

The conduits will be arranged below the surface of the ground in a manner similar to ordinary drainage-tubes, as indicated in Fig. 2, so that the cultivation of the surface will not in any manner be interfered with, and these conduits, as well as the reservoirs, may be formed of wood, stone, cement, earthenware, or any other suitable material.

It is obvious that any required number of reservoirs may be employed and arranged in any desired manner, according to the nature of the ground. It is also obvious that the reservoirs or conduits may be of any required size or capacity and located at any distance apart in order that when filled they may be employed for watering stock, for irrigation, and other purposes.

Referring more particularly to Fig. 3 of the drawings, which illustrates one of the reservoirs or tanks, 20 indicates the side walls, which may be formed of wooden planks or other suitable material. The inlet drain-tube 15 communicates with the reservoir at a point near the surface of the ground, while the outlet is disposed at a convenient distance above the bottom of the reservoir in order that the latter may form a catch-basin for sand, silt, and other accumulations, which would otherwise flow through the outlet-conduit and which may be removed as occasion may require. At the outlet side of the reservoir are guides 21 for the reception of a vertically-movable valve 22, which may be formed of a slidable plank or of metal, the valve being designed to close the mouth of the outlet-conduit when it is desired to prevent the passage of water therethrough, this being done whenever it is necessary to accumulate a body of water in the tank for the use of cattle, for irrigating purposes, or to form a strong head of water for flushing the outlet-conduit and washing out any sediment therein. Provision is also made for automatically closing the outlet by means of this valve in the event of overflowing of a volume of water beyond or in excess of the capacity of the conduit to thereby prevent the choking of the conduits by sand and foreign material. The upper end of the valve or valve-stem is adapted to suitable guides 23 and at a point near its upper end is provided with a box 24 for the reception of stones or other weights, or an iron or similar weight may be secured to the upper portion of the stem in order to effect a quick and positive downward movement of the valve when necessary. Under ordinary circumstances the valve is held in open position by means of a pivoted trip or prop 25, adapted to engage under a projecting portion of the valve-stem, and the water is allowed to flow naturally in the reservoir, through the inlet-pipe, and thence out through the outlet-pipe, any matter held in suspension being deposited in the lower portion of the reservoir.

To the standards, which form the guides 23, is pivoted a cover 26, having a downwardly and rearwardly projecting arm 27, adapted when moved to the dotted-line position of Fig. 3 to engage with the trip or prop 25 and allow the valve to descend under the influence of the weight 24. To the forward edge of the cover 26 is hinged a plate 28, which may be arranged at a slight angle to the vertical, the lower edge of said plate being supported by one or more lugs 29, projecting from the inner face of a strip 30, which is pivotally connected to the upper portion of the reservoir at a point slightly above the mouth of the inlet-pipe. The two strips 28 and 30 are arranged at an obtuse angle to each other, the strip 30 being inclined forwardly or outwardly from the line of the tank and projecting slightly above the surface of the ground, so that in the event of the overflow of the creek or other stream being drained and the accumulation of water on the surface of the ground in the vicinity of the reservoir the strip 30 will be washed inwardly and fall to the dotted-line position indicated in Fig. 3. This movement will trip the strip 28 and cover 26, the latter falling by gravity to the dotted-line position of Fig. 3, and its rearwardly-extended arm 27 moving into engagement with the prop 25, the prop being tripped and allowing the valve to descend and close the outlet. This operation is intended to take place when an overflow occurs for the purpose of preventing the body of sand, silt, or other material carried by the water accumulating in the conduits and choking the same, and unless this or similar provision is made for the purpose it may require digging up the conduits in order to remove the heavy matter carried by the water during the overflow.

The covers 26, in connection with the strips 28, serve to prevent the entrance of sand and trash from the surface; but in some cases the cover 26 may be in the form of a simple bar or strip of wood or other material where it is desirable to keep the reservoir open to the air.

The volume of water passing through the conduits will always deposit sediment therein, and to wash out the sediment and flush the conduits the valves may be closed manually until sufficient volume of water accumulates in the reservoirs to effect the desired result, and in similar manner the valves may be retained closed in order that water may accumulate to be employed for stock for irrigating or other purposes.

With an apparatus of this kind the water is completely controlled and either entirely carried off or partly reserved, as may be required, so that land which has heretofore been worthless by reason of a surplus of water may be restored to a useful condition and preserved in that condition with very little trouble and at small expense.

A further advantage is attained by closing the valves on the lower reservoirs and permitting the accumulation of sufficient quantities of water to overflow the tanks for irrigating purposes when required, or if the conduit-sections be slightly spaced or provided with openings underground irrigation may be effected when necessary.

Another advantage gained by this apparatus is that land which is rendered worthless by a surplus of water at one season and a dearth of water at other seasons may be rendered uniformly valuable by carrying off the surplus water during the wet season and reserving a supply of the surplus water for use during the dry season. To this end the reservoirs may be constructed large enough and placed at sufficiently close intervals to store the requisite quantity to meet the demand.

The reservoirs may be arranged in groups with the conduits from several reservoirs leading into one larger main reservoir, and thus provide for draining different parts of the field, or the reservoirs and conduits may be arranged to conduct the surplus water to storage reservoirs or tanks in different parts of the field or arranged in any other required manner to accomplish the desired results, and I do not, therefore, wish to be limited to any particular or specific relative arrangement of the connected reservoirs and conduits.

Having thus described the invention, what is claimed is—

1. A drainage apparatus comprising a conduit, intervening reservoirs arranged in the line of the conduit and at successive lower levels, and an automatic valve for closing the outlet from each reservoir, said valve being closed on the entrance of surface drainage to the top of the tank.

2. A drainage apparatus comprising a plurality of tanks or reservoirs embedded in the ground at successive lower levels, conduits connecting the reservoirs, the conduit-outlet from each reservoir being at a point above the bottom of the reservoir to thereby form a catch-basin for sediment, gravity-valves for closing the outlets from said reservoirs, and means operable by the flow of surface drainage into the reservoirs for automatically tripping said valve and thereby effecting the closing of the outlet.

3. A draining apparatus comprising a plurality of tanks or reservoirs embedded in the ground at successive lower levels, conduits leading from the lower to the upper parts of the reservoirs consecutively and at a sufficient grade to cause the water to flow through them, gravity-valves disposed to close the outlets from said reservoirs, and trip means whereby said valves may be movably supported in their open position and rendered operative by releasing the trips, substantially as described.

4. In an irrigating or draining apparatus, a reservoir adapted to be embedded in the ground to be drained or irrigated, an intake-conduit leading into the reservoir at or near the top, an outflow-conduit leading from the reservoir at or near the bottom, a valve slidably disposed relative to said outflow-conduit and adapted when closed to shut off the outflow, a prop disposed to maintain said valve open, and a trip device operable by the overflow of water and adapted to release said prop and permit the valve to close, substantially as described.

5. In an irrigating or draining apparatus, a reservoir adapted to be embedded in the ground to be drained or irrigated, an intake-conduit leading into the reservoir at or near the top, an outflow-conduit leading from the reservoir at or near the bottom, a valve slidably disposed relative to said outflow-conduit and adapted when closed to shut off the outflow, a prop disposed to maintain said valve open, a trip-lever pivotally supported at one end adjacent to said prop and adapted when actuated to release said prop, a stop-lever movably connected by one end to said reservoir, and a trip-arm between said trip-lever and stop-lever, and adapted to hold said trip-lever out of action, substantially as described.

In testimony that I claim the foregoing as my own I have hereto affixed my signature in the presence of two witnesses.

BENJAMIN F. SUDDATH.

Witnesses:
M. B. CARTER,
W. N. DYER.